United States Patent
Anton

(10) Patent No.: US 11,820,187 B2
(45) Date of Patent: Nov. 21, 2023

(54) HYDROPNEUMATIC SUSPENSION SYSTEM FOR VEHICLES

(71) Applicant: HYDAC MOBILHYDRAULIK GMBH, Sulzbach/Saar (DE)

(72) Inventor: Marc Anton, Völklingen (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 0 days.

(21) Appl. No.: 17/910,928

(22) PCT Filed: Mar. 1, 2021

(86) PCT No.: PCT/EP2021/055041
§ 371 (c)(1),
(2) Date: Sep. 12, 2022

(87) PCT Pub. No.: WO2021/197736
PCT Pub. Date: Oct. 7, 2021

(65) Prior Publication Data
US 2023/0133918 A1    May 4, 2023

(30) Foreign Application Priority Data
Apr. 2, 2020 (DE) .................. 10 2020 002 124.7

(51) Int. Cl.
*B60G 17/015* (2006.01)
*B60G 11/26* (2006.01)
(Continued)

(52) U.S. Cl.
CPC ........ *B60G 17/0152* (2013.01); *B60G 11/265* (2013.01); *B60G 11/30* (2013.01);
(Continued)

(58) Field of Classification Search
CPC .. B60G 17/0152; B60G 11/265; B60G 11/30; B60G 17/056; B60G 2400/252; B60G 2400/5122; B62D 33/0608
See application file for complete search history.

(56) References Cited

U.S. PATENT DOCUMENTS 5,271,632 A * 12/1993 Glaser ................... B60G 9/02
280/124.112
5,547,211 A * 8/1996 Runkel ................ B60G 21/073
280/5.506
(Continued)

FOREIGN PATENT DOCUMENTS

DE      43 24 289    1/1995
DE  10 2004 040 636   2/2006
(Continued)

OTHER PUBLICATIONS

International Search Report (ISR) dated May 27, 2021 in International (PCT) Application No. PCT/EP2021/055041.

*Primary Examiner* — Faye M Fleming
(74) *Attorney, Agent, or Firm* — WENDEROTH, LIND & PONACK, L.L.P.

(57) ABSTRACT

A hydropneumatic suspension system for vehicles, at least consisting of an axle suspension (10) and a cabin suspension (12), which for supplying them with pressurized fluid, can be connected to a pressure supply source, is characterized in that both the axle suspension (10) and the cabin suspension (12) can be actuated jointly by means of an control device (14), and in that, by means of a priority detection system (16) involving a sensor device (18) for the respective suspension (10, 12), the supply with pressurized fluid of the one suspension (10, 12) takes precedence depending on demand over the other suspension (12, 10).

10 Claims, 1 Drawing Sheet

(51) Int. Cl.
   *B60G 11/30*     (2006.01)
   *B60G 17/056*    (2006.01)
   *B62D 33/06*     (2006.01)

(52) U.S. Cl.
   CPC ....... *B60G 17/056* (2013.01); *B62D 33/0608*
          (2013.01); *B60G 2400/252* (2013.01); *B60G*
                                    *2400/5122* (2013.01)

(56)               References Cited

U.S. PATENT DOCUMENTS 9,084,388  B2      7/2015  Bitter
   10,442,475 B2 *   10/2019  Wagner .................. B60G 17/06
   2009/0051130 A1    2/2009  Huth
   2011/0252778 A1   10/2011  Bitter

FOREIGN PATENT DOCUMENTS

DE      20 2010 027 964       10/2011
   DE      10 2015 007 075       12/2016
   DE      10 2014 109 593       11/2017
   EP              1769951 A1 *   4/2007  ........... B60G 17/056
   EP             2 380 422      10/2011

* cited by examiner

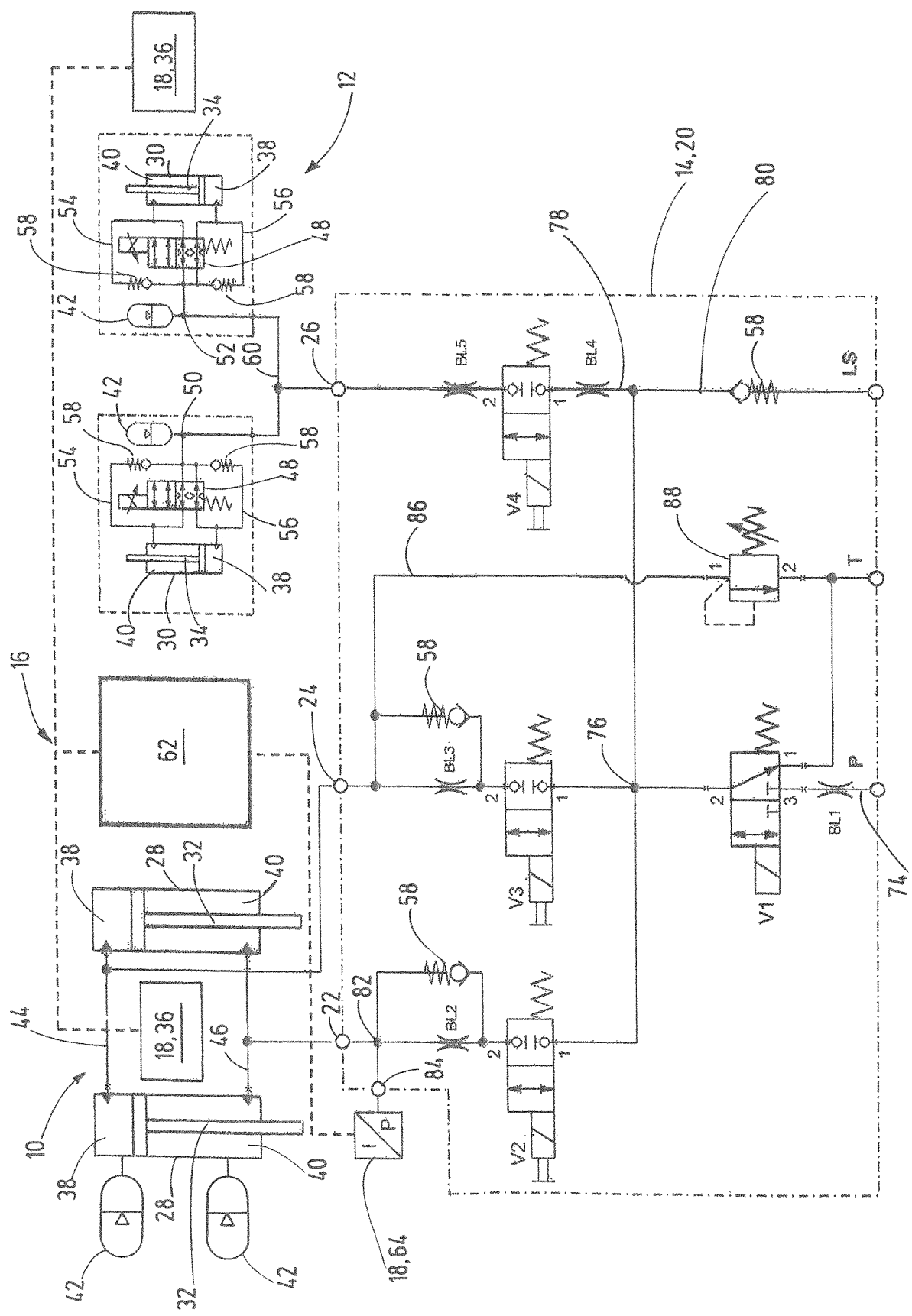

HYDROPNEUMATIC SUSPENSION SYSTEM FOR VEHICLES

The invention relates to a hydropneumatic suspension system for vehicles, at least consisting of an axle suspension and a cabin suspension, which for supplying them with pressurized fluid can be connected to a pressure supply source.

An axle suspension device for vehicles, in which load conditions change, is known from DE 10 2004 040 636 A1. The device is equipped with: two suspension cylinders, each having pressure chambers; a load-sensing system for generating pressure; a supply line forming two main branches between these chambers and a pump port and a tank port and level control system. Two valves are installed in each main branch. One of the valves in the first main branch is a pressure control valve, via which the pressure setting for the respective predefinable pressure chamber of the respective suspension cylinder and the level control are achieved, for which purpose the pressure control valve can be actuated electrically by means of a control device.

A damping system in the form of a hydraulic cabin suspension is known from DE 10 2015 007 075 A1. The system is equipped with a hydraulically actuated differential cylinder that is deflected and rebounds, and with a hydraulic accumulator connected to the differential cylinder at the end of its piston chamber and rod chamber. The piston and rod chambers of the differential cylinder are interconnected via a proportional throttle valve and two check valves in such a way that, both when the cylinder piston is retracted and when it extends, essentially only the differential volume from the piston chamber and rod chamber is routed via the proportional throttle valve during operation of the system. In this way, proportional damping is provided for the respective differential cylinder.

In practice, such an axle suspension device and such a cabin suspension system are regularly used as hydropneumatic suspension systems for a vehicle, in that they are each installed at the vehicle in the form of a separately operating assembly having its own fluid supply and associated valve control, which necessitates the provision of suitable installation space on the vehicle.

The invention addresses the problem of improving the known hydropneumatic suspension system to be able to be operated in an installation-space-saving, energy-efficient manner and with high control dynamics.

This problem is solved by a hydropneumatic suspension system for vehicles, having the features of claim 1 in its entirety.

In accordance with the characterizing part of patent claim 1, the hydropneumatic suspension system according to the invention is characterized in that a control device can be used to jointly to control both the axle suspension and the cabin suspension, and in that, based on a priority detection system including a sensor device for the respective suspension, the supply with pressurized fluid of the one suspension takes precedence depending on demand over the other suspension.

As a result—in contrast to the suspension system known from the prior art—the axle suspension and the cabin suspension are combined in a joint suspension concept. Depending on the sensor data acquired by the sensor device, the priority detection system, regularly implemented by a computer unit, determines, which of the two suspensions takes precedence over the other where the supply with fluid at a presettable pressure is concerned to ensure their function in an optimum manner. Due to the central priority detection system, which actuates the control device accordingly, significantly reduced control effort at reduced hydraulic drive power is required to actuate the two suspensions. In addition, by combining the suspension systems for the axle and the cabin in a joint, interconnected actuation concept, the amount of hydraulic piping required as part of the required interconnection, as well as the hydraulic pump capacity and the required volume of control valves, can be reduced, which helps to reduce the installation space required on the vehicle.

By reducing the number of parts for the hydropneumatic suspension system, the weight is also reduced and there is no undesirable overlap or interference due to the adjustment of the respective suspension, in particular because of level control, via the priority detection system.

In a preferred exemplary embodiment, provision is made for the control device to be formed from a single control block having at least one utility port each for the assigned suspension as well as a pressure supply port and a return port. This keeps the number of fluid lines to a minimum, which also reduces the assembly effort for the suspension system.

In a further preferred exemplary embodiment, provision is made for the respective suspension to have at least one hydraulic power cylinder with a piston rod unit, the position of which is monitored by means of the sensor device in the form of at least one displacement sensor. In contrast to hydraulic condition monitoring using pressure sensors, the displacement sensors are used to directly detect the extending and retraction behavior of the respective power cylinder, in which way conclusions can be drawn about the dynamics of the vehicle damping and suspension system as a whole.

In a further preferred exemplary embodiment provision is made for the fluid end of both the piston chamber and the rod chamber of a power cylinder to be connected to at least one hydraulic accumulator, the gas-end preload of which presets the spring/damper behavior for the respective power cylinder. Owing to the circuitry used, in which the hydraulic accumulators can react directly to changes in the piston-rod chamber of a power cylinder, a highly dynamic response of the suspension system as a whole is achieved.

In a further preferred exemplary embodiment, for actuating the control device for the power cylinders provision is made for the priority detection system to have a computer unit, which evaluates the sensor data from the sensor device, which preferably has, in addition to the displacement sensors, at least one pressure monitoring device for at least parts of the hydraulic supply circuit of the control device. As a result, by means of the displacement sensors or position sensors based on the pressure monitoring device the position monitoring of the power cylinders can be checked in a redundant manner.

In a further preferred exemplary embodiment provision is made for the control device to be provided with individual control valves, preferably 2/2-way valves, which are assigned to a respective power cylinder and supplied with pressure fluid from a central valve, preferably in the form of a 3/2-way valve. As a result, the suspension system can be manufactured easily and cost-effectively using standard components, and additionally, the fast-switching directional control valves mentioned further improve the overall dynamics of the suspension system.

In a further preferred exemplary embodiment provision is made for the power cylinders of the axle suspension to be permanently interconnected in a fluid-conveying manner both at the piston end and at the rod end, and for the power cylinders to be each connected to a control valve on both the piston end and the rod end for the supply and removal of fluid relating to the axle suspension. This reduces the number of connections required when using hydraulic lines.

In a further preferred exemplary embodiment provision is made for the cabin suspension to be supplied with fluid by means of a further control valve starting from the central valve or to be relieved of pressure in the direction of the return port. In this way, the individual directional valves or switching valves are used to achieve a switching logic for the suspension, subdivided into valve assemblies, which increases functional reliability.

In a further preferred exemplary embodiment provision is made for the pressure fluid supply of the respective power cylinder to occur after actuation of the assignable control valve using the pressure of the pressure supply source and, for discharging pressure fluid from the respective power cylinder, this occurs via an orifice or throttle in a delayed manner. Such an orifice or throttle, which can also be of adjustable design, can be used to appropriately throttle the return flow of working fluid from the cylinders in the direction of the tank, which also contributes to reducing the speed of retraction of the power cylinders during lowering operations as part of the level control.

In another preferred exemplary embodiment, the control block is additionally provided with a load sensing port leading to the inlet end of the control valves. If necessary, the load-sensing port mentioned can be used to control the pressure supply for the suspension system by actuating a swing pump, and/or the load-sensing port can be used to supply fluid to other hydraulic components depending on demand.

Below, a, hydropneumatic suspension system according to the invention will be explained in more detail with reference to the drawing. The single FIGURE shows the hydropneumatic suspension system according to the invention not to scale and in the manner of a hydraulic circuit diagram.

The single FIGURE shows a hydropneumatic suspension system for vehicles according to the invention. The suspension system has an axle suspension 10 and a cabin suspension 12, which can be controlled in conjunction by means of a control device 14 of the suspension system. To supply pressure fluid to the axle suspension 10 and the cabin suspension 12, the suspension system can be connected to a pressure supply source (not shown in the FIGURES), wherein the supply of pressure fluid to the one suspension 10, 12 takes precedence over the respective other suspension 12, 10, as controlled by means of a priority detection system 16, which is part of the suspension system and including a sensor device 18 for the respective suspension 10, 12.

The control device 14 is formed from only one single control block 20. The control block 20 has a first utility port 22 and a second utility port 24, to which the axle suspension 10 is connected, and a third utility port 26, to which the cabin suspension 12 is connected. In addition, a pressure supply port P and a load sensing port LS, each for connection to the pressure supply source, and a return port T are provided on the control block 20.

The axle suspension 10 and the cabin suspension 12 each have two hydraulic power cylinders 28, 30. The travels of the two piston rod units 32, 34 of the power cylinders 28, 30 of the respective suspensions 10, 12 are jointly monitored by a respective displacement sensor 36. It is also conceivable for the travel of each piston-rod unit 32, 34 of the power cylinders 28, 30 to be monitored by a respective displacement sensor module not shown in the FIGURES, wherein the two displacement sensor modules in conjunction form the displacement sensor 36 of the respective suspension 10, 12. The displacement sensors 36 are part of the sensor device 18, which is part of the suspension system.

Every power cylinder 28, 30 of the axle suspension 10 and the cabin suspension 12 has a piston chamber 38 and a rod chamber 40.

The fluid end of one hydraulic accumulator 42 each is connected to the piston chamber 38 and to the rod chamber 40 of a power cylinder 28 of the axle suspension 10, which hydraulic accumulators 42 specify the spring/damper behavior for this power cylinder 28. The two piston chambers 38 of the power cylinders 28 of the axle suspension 10 are permanently interconnected in a fluid-conveying manner via a first fluid line 44, and the two rod chambers 40 are interconnected via a second fluid line 46.

The piston chamber 38 and the rod chamber 40 of each power cylinder 30 of the cabin suspension 12 are jointly connected to a respective associated hydraulic accumulator 42 via a 4/2-way proportional valve 48 each, wherein an adjustable closing force under electromagnetic control can be used to move the valve piston of the 4/2-way proportional valve from a first position shown in the FIGURE to a second position against the force of a compression spring. In this case, the rod chamber 40 of the respective power cylinder 30 is connected to a first port 48.1 of the respective proportional valve 48 and the piston chamber 38 of this power cylinder 30 is connected to a second port 48.2 of the respective proportional valve 48 in a fluid-conveying manner. Further, the respective proportional valve 48 has a third 48.3 port and a fourth 48.4 port, both of which are connected to a first branching point 50 and a second branching point 52, respectively, in a fluid-conveying manner. The hydraulic accumulator 42 is connected to the respective branching point 50, 52, as is the rod chamber 40 via a third fluid line 54 and the piston chamber 38 of the respective assigned power cylinder 30 via a fourth fluid line 56. One check valve 58 each is provided in the third fluid line 54 and fourth fluid line 56, which check valve 58 opens in the direction of the fluid flow of the respective power cylinder chambers 38, 40 against the force of a compression spring. The two branching points 50, 52 of the cabin suspension 12 are interconnected in a fluid-conveying manner via a fifth fluid line 60. The gas-end preload of the respective hydraulic accumulator 42 determines the spring-damper behavior for the respective power cylinder 30 of the cabin suspension.

In the first end position of the valve piston of the respective proportional valve 48 of the cabin suspension 12 shown in FIG., the first port 48.1 is connected to the third port 48.3 and the second port 48.2 is connected to the fourth port 48.4 in a fluid-conveying manner via a fluid connection having one throttle each. In the second end position, the first port 48.1 is connected to the third port 48.3 in a fluid-conveying manner and the second port 48.2 is connected to the fourth port 48.4 in a fluid-conveying manner via respective fluid connections free of flow-constrictions.

The priority detection system 16 has a control unit in the form of a computer unit 62, on which software for evaluating the sensor data of the sensor device 18 and for actuating the control device 14 based on the evaluated sensor data is installed. The sensing device 18 includes displacement sensors 36 and a pressure monitoring device 64 for detecting fluid pressure in a part of the hydraulic supply circuit of the control device 14, each of which is connected to the computer unit 62 on the inlet end.

The control device 14, which is a part of the priority detection system 16, has a first control valve V2 and a second control valve V3 that supply pressurized fluid to the power cylinders 28 of the axle suspension 10, and a third control valve V4 that supplies pressurized fluid to the power cylinders 30 of the cabin suspension 12. Every control valve V2, V3, V4 is designed as a 2/2-way switching valve. In addition, the control device 14 has a central valve V1 in the form of a 3/2-way switching valve that supplies pressurized fluid to every control valve V2, V3, V4.

The first port V1.1 of the central valve V1 is connected to the return port T of the control block 20 in a fluid-conveying manner and the third port V1.3 of the central valve V1 is connected to the pressure supply port P of the control block 20 via a sixth fluid line 74 in a fluid-conveying manner.

A second port V1.2 of the central valve V1 is connected to a third branch point 76 in a fluid-conveying manner, which is connected to a first port V2.1, V3.1 of each of the first control valve V2 and the second control valve V3 and to a first port V4.1 of the third control valve V4 via a seventh fluid line 78, each in a fluid-conveying manner. The third branch point 76 is also connected to the load sensing port LS of the control block 20 via an eighth fluid line 80 in a fluid-conveying manner. The valve piston of the central valve V1 can be moved in an electromagnetically controlled manner from a first switching position shown in FIG. to a second switching position against the force of a compression spring. In the first switching position, the second port V1.2 of the central valve V1 is connected to its first port V1.1 in a fluid-conveying manner and free of flow constrictions, wherein the third port V1.3 of the central valve V1 is disconnected. In the second switching position, the second port V1.2 of the central valve V1 is connected to the third port V1.3 in a fluid-conveying manner, wherein the first port V1.1 is disconnected.

The first control valve V2 has its second port V2.2 connected to a fourth branch point 82, which is connected to the first utility port 22 of the control block 20 and to a control block port 84 for the pressure monitoring device 64 in a fluid-conveying manner. The first utility port 22 is connected to the second fluid line 46 of the axle suspension 10 in a fluid-conveying manner. The pressure monitoring device 64 as a pressure-to-current converter is connected to the port 84 for the pressure monitoring device 64. The second port V3.2 of the second control valve V3 is connected to the second utility port 24 of the control block 20, which is connected to the first fluid line 44 of the axle suspension 10 in a fluid-conveying manner. The second port V4.2 of the third switching valve V4 is connected to the third utility port 26 of the control block 20, which is connected to the fifth fluid line 60 of the axle suspension 10 in a fluid-conveying manner. The valve pistons of the first switching valve V2, the second switching valve V3 and the third switching valve V4 can each be moved against the force of a compression spring in an electromagnetically controlled manner from a first switching position shown in the FIGURE to a second switching position. In the first switching position, the first port V2.1, V3.1, V4.1 of the respective switching valve V2, V3, V4 are separated from the second port V2.2, V3.2, V4.2, whereas in the second switching position, these ports are interconnected in a fluid-conveying manner without flow restriction.

The outlet end of the computer unit 62 is electrically connected to the central valve V1, the first V2, the second V3 and the third V4 control valve as well as the two proportional valves 48 of the cabin suspension 12 to individually actuate the respective valve Vito V4.

A first throttle BL1 is provided in the sixth fluid line 74 between the pressure supply port P of the control block 20 and the third port V1.3 of the central valve V1. A second throttle BL2 is installed in the fluid line between the second port V2.2 of the first control valve V2 and the fourth branch point 82, and a third throttle BL3 is installed in the fluid line between the second port V3.2 of the second control valve V3 and the second utility port 24. A fourth throttle BL4 is provided in the seventh fluid line 78 between the third branch point 76 and the first port V4.1 of the third control valve V4. A fifth throttle BL5 is installed in the fluid line between the second port V4.2 of the third control valve V4 and the third utility port 26. The respective second to fifth throttles BL2 to BL5 are used in particular to delay the discharge of pressure fluid from the respective power cylinders 28, 30.

In parallel to the second throttle BL2, a check valve 58 is provided between the second port V2.2 of the first control valve V2 and the fourth branch point 82, which check valve 58 opens in the direction of the fourth branch point 82 against the force of a compression spring. In parallel with the third throttle BL3, a check valve 58 is installed between the second port V3.2 of the second control valve V3 and the second utility port 24, which check valve 58 opens in the direction of the second utility port 24 against the force of a compression spring. A check valve 58 is introduced into the eighth fluid line 80 between the third branch point 76 and the load-sensing port LS of the control block 20, which check valve 58 opens in the direction of the load-sensing port LS against the force of a compression spring.

An adjustable pressure relief valve 88 is installed between the second utility port 24 and the return port T in a ninth fluid line 86, wherein the inlet end of adjustable pressure relief valve 88 is connected to the second utility port 24 and the outlet end of said valve 88 is connected to the return port T in a fluid-conveying manner.

The operating principle of the suspension system according to the invention is explained in more detail below:

If the computer unit 62 determines, as a function of the measured values of at least one of the displacement sensors 36 and, if applicable, of the pressure monitoring device 64, that the axle suspension 10 and/or the cabin suspension 12 require(s) pressure fluid, then the central valve V1, if this is not already in its second switching position, is activated by the computer unit 62 in such a way that the valve piston of the central valve V1 moves into its second switching position. As a result, every control valve V2, V3, V4 is supplied with pressurized fluid via the central valve V1 and the third branch point 76.

Depending on the demand for pressure fluid of the respective suspension 10, 12, the respective control valve V2, V3, V4 is then controlled by the computer unit 62 in such a way that its valve piston moves from its first switching position to its second switching position, as a result of which the respective power cylinder 28, 30 of the respective suspension 10, 12 is supplied with pressure fluid. In this case, the supply of the suspension 10, 12 having the greater demand for pressure fluid takes precedence.

If the first control valve V2 is arranged in its second switching position, the rod chambers 40 of both power cylinders 28 of the axle suspension 10 are simultaneously supplied with pressurized fluid via the central valve V1 and the first control valve V2, resulting in the piston rod units 32 of the power cylinders 28 retracting. At the same time, the fluid in the respective piston chambers 38 is at least partially displaced into the hydraulic accumulator 42 connected to the piston chambers 38. If the second control valve V3 is arranged in its second switching position, the piston chambers 38 of both power cylinders 28 of the axle suspension 10 are simultaneously supplied with pressurized fluid via the central valve V1 and the second control valve V3, resulting in the piston rod units 32 of the power cylinders 28 extending. At the same time, the fluid in the respective rod chambers 40 is at least partially displaced into the hydraulic accumulator 42 connected to the rod chambers 40. If the third control valve V4 is arranged in its second switching position, the piston chambers 38 and the rod chambers 40 of both power cylinders 30 of the cabin suspension 12 are simultaneously supplied with pressurized fluid.

For the discharge of pressure fluid from the piston chambers 38 and/or the rod chambers 40 of the power cylinders 28, 30 of the respective suspension 10, 12, when the valve piston of the respective control valve V2, V3, V4 is arranged in its second switching position, the central valve V1 is actuated by means of the computer unit 62 in such a way that the valve piston of the central valve V1 moves into the first switching position, in which the central valve V1 connects the third branching point 76 to the return port T.

If the fluid pressure at the second utility port 24 exceeds a predeterminable threshold value, the pressure relief valve 88 is used to relieve this pressure towards the return port T via the ninth fluid line 86.

The invention claimed is:

1. A hydropneumatic suspension system for vehicles, at least consisting of an axle suspension (10) and a cabin suspension (12), which for supplying them with pressurized fluid, can be connected to a pressure supply source, characterized in that both the axle suspension (10) and the cabin suspension (12) can be actuated jointly by means of a control device (14), and in that, by means of a priority detection system (16) involving a sensor device (18) for the respective suspension (10, 12), the supply with pressurized fluid of the one suspension (10, 12) takes precedence depending on demand over the other suspension (12, 10).

2. The suspension system according to claim 1, characterized in that the control device (14) is formed by a single control block (20) having at least one utility port each (22, 24, 26) for the assigned suspension (10, 12) as well as a pressure supply port (P) and a return port (T).

3. The suspension system according to claim 1, characterized in that the respective suspension (10, 12) comprises at least one hydraulic power cylinder (28, 30) with a piston rod unit (32, 34), the position of which is monitored by means of the sensor device (18) in the form of at least one displacement sensor (36).

4. The suspension system according to claim 1, characterized in that at the fluid end both the piston chamber (38) and the rod chamber (40) of a power cylinder (28, 30) are connected to at least one hydraulic accumulator (42), the gas-end preload of which presets the spring-damper behavior for the respective power cylinders (28, 30).

5. The suspension system according to claim 1, characterized in that, for actuating the control device (14) for the power cylinders (28, 30), the priority detection system (16) has a computer unit (62) which evaluates the sensor data from the sensor device (18), which preferably has, in addition to the displacement sensors (36), at least one pressure monitoring device (64) for at least parts of the hydraulic supply circuit of the control device (20).

6. The suspension system according to claim 1, characterized in that the control device (20) is provided with individual control valves (V2, V3, V4), preferably 2/2-way valves, which are assigned to a respective power cylinder (28, 30) and supplied starting from a central valve (V1), preferably in the form of a 3/2-way valve.

7. The suspension system according to claim 1, characterized in that the power cylinders (28, 30) are permanently interconnected in a fluid-conveying manner both at the piston end and at the rod end, and in that, for the supply and removal of fluid relating to the axle suspension (10), the power cylinders (28) are each connected to a control valve (V2, V3) both at the piston end and at the rod end.

8. The suspension system according to claim 1, characterized in that the cabin suspension (12) can be supplied with fluid by means of a further control valve (V4) starting from the central valve (V1) or be relieved of pressure in the direction of the return port (T).

9. The suspension system according to claim 1, characterized in that the pressure fluid supply of the respective power cylinder (28, 30) occurs after actuation of the assignable control valve (V2, V3, V4) using the pressure of the pressure supply source and, for discharging pressure fluid from the respective power cylinder (28, 30), this occurs via an orifice or throttle (BL2 to BL5) in a delayed manner.

10. The suspension system according to claim 1, characterized in that the control block (20) additionally comprises a load sensing port (LS) leading to the inlet end of the control valves (V2, V3, V4).

* * * * *